United States Patent [19]

Cummings

[11] Patent Number: 4,482,112
[45] Date of Patent: Nov. 13, 1984

[54] WINDBLAST ARM PROTECTOR ASSEMBLY

[75] Inventor: Robert J. Cummings, Hermosa Beach, Calif.

[73] Assignee: The United States of America as represented by the Secretary of the Air Force, Washington, D.C.

[21] Appl. No.: 418,952

[22] Filed: Sep. 16, 1982

[51] Int. Cl.³ ............................................. B64D 25/02
[52] U.S. Cl. ............................... 244/122 AG; 297/466
[58] Field of Search ....... 244/122 AG, 122 R, 122 A, 244/122 B; 297/464, 465, 466, 485; 280/801, 808, 748

[56] References Cited

U.S. PATENT DOCUMENTS

| | | | |
|---|---|---|---|
| 2,940,701 | 6/1960 | Beem et al. | 244/122 |
| 3,202,384 | 8/1965 | Martin | 244/122 |
| 3,249,385 | 5/1966 | Boyce et al. | 244/122 B |
| 3,271,797 | 9/1966 | Boyce | 244/122 B |
| 3,329,464 | 7/1967 | Barwood et al. | 244/122 B |
| 3,957,231 | 5/1976 | Miller et al. | 244/122 AG |
| 4,081,156 | 3/1978 | Ideskar | 244/122 AG |
| 4,215,835 | 8/1980 | Wedgwood | 244/122 AG |

*Primary Examiner*—Galen L. Barefoot
*Attorney, Agent, or Firm*—Donald J. Singer; Frank J. Lamattina

[57] ABSTRACT

A windblast arm protector assembly for use by an occupant of an open-type ejection seat of an aircraft. The assembly includes, for each arm of the seat occupant, a full length fabric sleeve member which is independent of any garment body, which is a part of the seat's restraint system (rather than an item of personal protective equipment), and which is shaped and dimensioned from the shoulder area to its wrist area in the form of a flexed (i.e., bent) arm. During ejection of the seat and occupant together, the sleeve member is pulled forwardly and adjacent to the occupant's sides by associated co-acting components of the assembly, such that the arm is not extended into the windblast and is protected from it. Unlike the prior art, this arm protector assembly restrains the wrist area of the seat occupant's arm near the seat ejection handle, while the arm is restrained over its entire length. As a result, the windblast load is uniformly applied, and the restrained arm is protected from injury.

8 Claims, 1 Drawing Figure

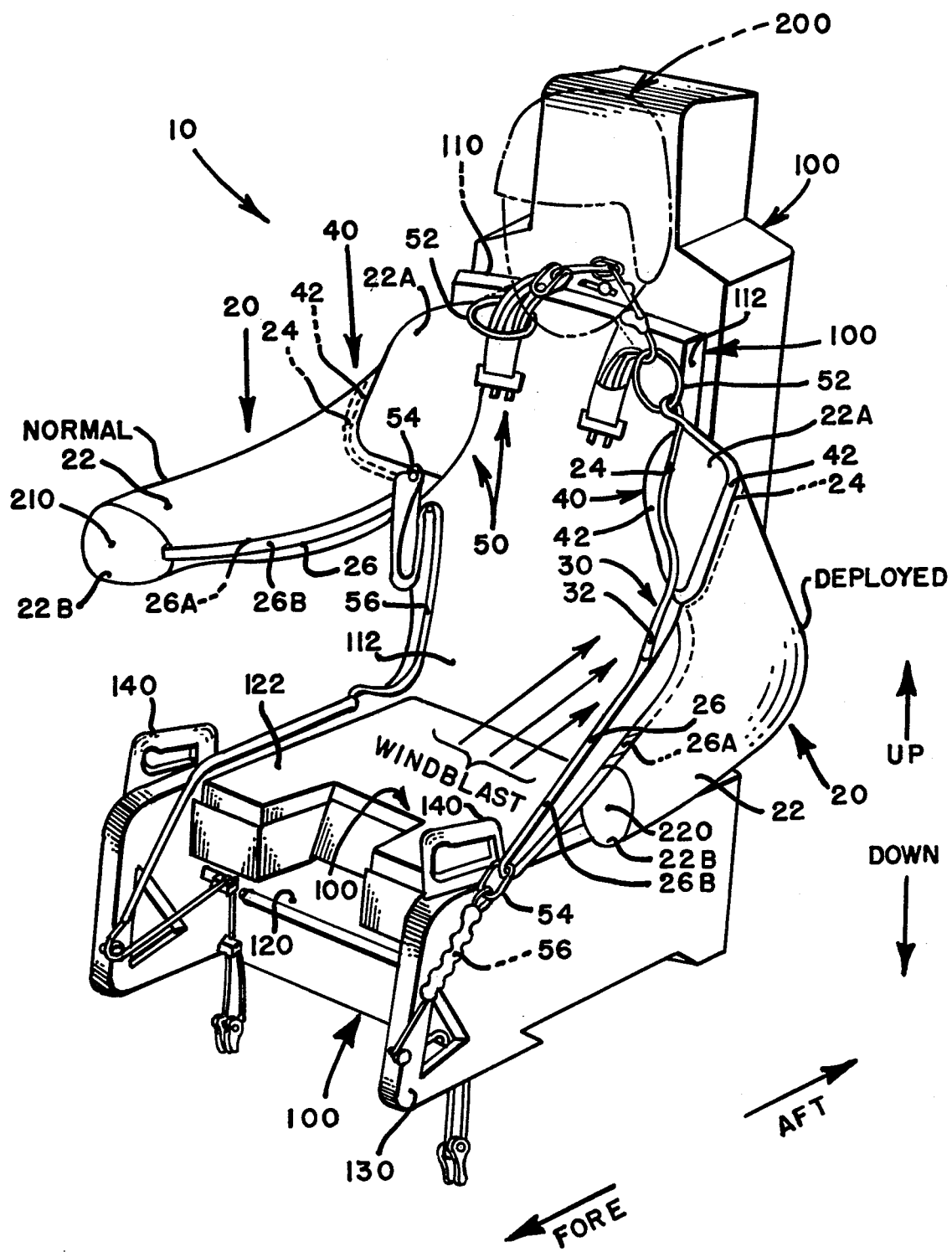

WINDBLAST ARM PROTECTOR ASSEMBLY

STATEMENT OF GOVERNMENT INTEREST

The invention described herein may be manufactured and used by or for the Government for governmental purposes without the payment of any royalty thereon.

BACKGROUND OF THE INVENTION

The instant invention relates to an arm restraint and, more particularly, to a novel assembly for protecting the arms of an occupant of an open-type ejection seat in an aircraft when the occupant and the seat are ejected together from the aircraft into the surrounding airstream, i.e., an assembly for preventing injury due to windblast to the arms of the ejection seat occupant.

When an ejection seat and its occupant are ejected from an aircraft, particularly at high speeds, the occupant is subjected to great pressure from the windblast. The situation is particularly dangerous if the occupant's limbs are caught in the windblast, because severe injury can result to the limbs. This is especially the case with regard to the occupant's arms, because the occupant may (and probably will) have an arm outstretched at the time of ejection, and therefore the arm will be subjected to the full force of the windblast.

As a result of the aforementioned serious problems, much work has been done in an attempt to solve it. Succinctly stated, arm restraints for protective use during ejection from an aircraft are many, and they are well known. However, it is fair and accurate to say that none of the prior art arm restraints are entirely satisfactory. Compelling evidence of this is the fact that presently there is not a single open ejection seat arm restraint operationally used in the U.S. Air Force. The principal reason for this is the non-acceptance of any presently-existing arm restraint either by the intended users (e.g., aircrew members, especially pilots) or by the scientific, medical, and technological advisers and experts involved. Accordingly, what is needed and is not presently available is a highly reliable, aircrew-acceptable, arm restraint.

SUMMARY OF THE INVENTION

The instant invention eliminates the aforesaid prior art problem, and thereby constitutes a significant advance in the state-of-the-art.

According to the instant invention, an arm restraining means is provided for each arm of the occupant of the ejection seat, with the arm restraining means being releasably secured to the ejection seat. The restraining means for each arm includes a bent, arms-length, sleeve member which is independent of any garment body, which is made of fabric, and which is donned by the user when he occupies the ejection seat. During ejection, a loop member of the arm restraining means which is positioned through the sleeve member is pulled forwardly (i.e., toward the seat occupant's side, near his knees) and is held there. As a result, the arm is close to the body, is not extended, and is effectively protected against windblast loads.

Therefore, it is an object of the instant invention to provide an arm restraining apparatus which will prevent the arms of an occupant of an aircraft ejection seat from being extended into the windblast during ejection, and which thereby will protect the arms of the seat occupant from being injured by the impact force of the windblast.

Another object of this invention is to provide an arm restraining apparatus which is a permanent part of the ejection seat's restraint system, rather than another article of an aircrew member's personal protective equipment, with the advantages of no connections or adjustments added to the ingress procedure, and good logistics, maintenance, and life cycle cost performance.

Still another object of the instant invention is to provide a windblast arm protecting apparatus which is readily acceptable to airflight crews (and others concerned with the safety of the crew), because of its simple design, light weight, low detectability in use, ease of donning and doffing, fail-safe reliability, and its status as a permanent component of the personnel restrain system.

Yet another object of this invention is to provide an arm restraining and protecting apparatus which has a universal fit (i.e., sized and shaped statistically to accomodate a 95 percentile arm, particularly in the dimension from the shoulder to the bottom of the flexed elbow), thereby reducing complexity and weight, and supporting design-to-cost goals.

A further object of this invention is to provide an arm restraining windblast protector in which the wrist area of the seat occupant's arm is restrained near the seat ejection handle, so that the windblast load is uniformly applied.

These objects of the instant invention, as well as other objects related thereto (e.g., the capability of the arm restraining and protecting apparatus of being used by the aircrew member while in the aircraft performing his duties, in addition to being an arm protector during ejection from the aircraft), will become readily apparent after a consideration of the instant invention, together with reference to the contents of the FIGURE of the drawing.

DESCRIPTION OF THE DRAWING

The single FIGURE of the drawing is a prospective view, in simplified pictorial and schematic form, of a preferred embodiment of the instant invention, with the intended occupier of the ejection seat being shown in phantom.

DESCRIPTION OF THE PREFERRED EMBODIMENT

As a preliminary matter, it is to be noted that in the interest of maintaining clarity of the drawing, while at the same time permitting easy comparison of the instant invention both in the normal condition (i.e., the non-ejection use) and as to the deployed condition (i.e., the ejection use), one sleeve member of the invention is shown in normal use and the other sleeve member of the invention is shown in use while deployed.

The preferred embodiment 10 of the instant invention, in its most basic and generic structural form, comprises: means (generally designated 20), for each arm (such as 210 and 220, as is shown in cross section) of the occupant 200 of an open ejection seat 100 of an aircraft (not shown), for accepting, supporting, and restraining (during ejection) the arm 210 or 220 while the arm is in the flexed (i.e., bent) position adjacent the occupant's side during ejection of the seat 100 and of the occupant 200 together from the aircraft; and means (generally designated 30), operably connected to the ejection seat 100 and to each arm restraining means 20, for releasably securing each arm restraining means 20 to the ejection seat 100.

More specifically, each arm restraining means 20 includes a full length sleeve member 22 which is independent of (i.e., not connected to, or any part of) any garment body, with the sleeve member 22 shaped and dimensioned from its shoulder area opening 22A to its wrist area opening 22B in the form of a flexed arm. It is here reiterated that, as a matter of preference, the sleeve is shaped and sized statistically to accommodate 95 percent of the intended users, and to do so without excess sleeve length which would interfere with hand functions. The sleeve member 22 is made of fabric, preferably of nylon.

In addition, each arm restraining means 20 further includes: a first loop member 24 disposed around, and attached to, the inside perimeter of the shoulder opening 22A; and, a second loop member 26 having a first portion 26A extending internally of the sleeve member 22 from the shoulder opening 22A to the wrist opening 22B and attached to the inner surface of the sleeve member 22 near the wrist opening 22B. This second loop member 26 has a second portion 26B extending externally of the sleeve member 22 from the wrist opening 22B to the shoulder opening 22A, with this second portion 26B of this second loop member 26 being releasably attached to the outer surface of the sleeve member 22. As a matter of preference the first and second loop members 24 and 26 are made of suitable webbing material, although they could be made of high strength nylon tape. Additionally, the second portion 26B of the second loop member 26 can be releasably attached to the outer surface of the sleeve member 22 by breakaway stitching, i.e., rip-out stitching. Each arm restraining means 20 further includes a means (generally designated 30), operably associated with the first loop member 24 and the second loop member 26, for interconnecting the first and second loop members 24 and 26. This means 30 preferably is an interconnecting strap 32 preferably made of suitable webbing material, although it could be made of high strength nylon tape. One end of the strap 32 is attached to the first loop member 24 and the other end of the strap 32 is attached to the second portion 26B of the second loop member 26.

As a matter of preference and not of limitation, each arm restraining means 20 further includes means (generally designated 40), attached to the shoulder opening 22A of the sleeve member 22, for holding open the shoulder opening 22A, thereby providing for easy donning and doffing capabilities of the sleeve member 22. This means 40 may consist of, or may include, tubing 42, preferably made of stiff nylon. The tubing 42 is attached to, and conforms to the shape of, the shoulder opening 22A.

As can be seen in the FIGURE of the drawing, the ejection seat 100 has a back pan portion 110 with a back pad section 112, a seat pan portion 120 with a seat pad section 112, and a lateral leg guard member 130 adjacent each side-edge of the seat pan portion 120. In this regard, it is to be noted that the means 50 for releasably securing each arm restraining means 20 to the ejection seat 100 includes: a first ring member 52 interconnecting the first loop member 24 and the back pad section 110 of the ejection seat 100; and a second ring member 54 interconnecting the second loop member 26 and a lanyard member 56, with the second ring member 54 initially disposed adjacent the shoulder opening 22A of the sleeve member 22, as shown with regard to the normal use mode in the FIGURE of the drawing. As a matter of preference, the ring members 52 and 54 are made of metal.

As a matter of practicality, the preferred embodiment 10 includes two arm restraining means 20 with each having a sleeve member 22. Although it is unlikely that the seat occupant 200 would be one-armed, the preferred embodiment 10 can be varied and adapted for that circumstance.

MANNER OF OPERATION AND OF THE USE OF THE PREFERRED EMBODIMENT

The manner of operation, and of use, of the preferred embodiment 10 of the instant invention can be easily ascertained by any person of ordinary skill in the art from the foregoing description, coupled with reference to the contents of the FIGURE of the drawing.

For others, the following explanation is given. After the prospective occupant 200 of the ejection seat 100 is seated, he dons the sleeve members 22 which are already releasably attached to the ejection seat 100. While wearing the sleeve members 22, the occupant 200 can perform any movements that he would be able to perform while occupying the ejection seat 100 without having the sleeve members 22 on. If ejection from the aircraft is necessary, the seat occupant 200 initiates the ejection. In the seat 100 shown in the FIGURE, ejection is initiated by pulling aft on the ejection handles 140.

When ejection is initiated, the pulling of the ejection handles 140 causes the lanyard members 56 to move forwardly and downwardly, the second ring member 54 (which is normally located near the armpit, i.e., the shoulder opening 22A) is pulled downwardly and forwardly by the movement of the lanyard member 56. In turn, the movement of the second ring member 54 rips out the stitching on the second portion 26B of the second loop member 26 and detaches that portion 26B from the outer surface of the sleeve member 22.

As a result, the second loop member 26 is tensioned against the sleeve member 22; the first loop member 24 supports the second loop member 26 and prevents the sleeve member 22 from sliding down the arm 210 or 220 being restrained by the sleeve member 22; the loop interconnection strap member 32 creates a tension load path between the top of the second portion 26B of the second loop member 26 and the back (i.e., aft) portion of the first loop member 24 and prevents the lower portion of the sleeve member 22 from moving backwardly; and the arm restraining means 20 provides support and protection to the arm 210 or 220 against windblast forces.

CONCLUSION

It is abundantly clear from all of the foregoing; and from the contents of the FIGURE of the drawing, that the stated objects of the instant invention, as well as other objects related thereto, have been achieved.

It is to be noted that, although there have been described and shown the fundamental and unique features of the instant invention, as applied to a preferred embodiment 10, nevertheless various other embodiments, variations, adaptations, substitutions, additions, and the like may occur to and can be made by those of ordinary skill in the art. For example, the instant invention can be adapted for use with an accelerating/deaccelerating sled, rather than an aircraft.

What is claimed is:

1. A windblast arm protector assembly for use by an occupant of an open ejection seat of an aircraft, comprising:
   a. means, for each arm of said occupant, for accepting, supporting, and restraining said arm while it is in a flexed position adjacent occupant's side during ejection of said seat and of said occupant together from said aircraft, wherein said means include a full length sleeve member independent of any garment body, with said sleeve member shaped and dimensioned from the shoulder area to its wrist area in the form of a flexed arm and has a shoulder opening and a wrist opening therein, a first loop member disposed around, and attached to the inside perimeter of said shoulder opening, a second loop member having a first portion extending internally of said sleeve member from said shoulder opening to said wrist opening and attached to the inner surface of said sleeve member near said wrist opening, wherein said second loop member has a second portion extending externally of said sleeve member from said wrist opening to said shoulder opening, with said second portion releasably attached to the outer surface of said sleeve member, and means, operably associated with said first and second loop members, for interconnecting said first and second loop members; and
   b. means, operably connected to said ejection seat and to said arm restraining means, for releasably securing said arm restraining means to said ejection seat.

2. A windblast arm protector assembly, as set forth in claim 1, wherein said means for interconnecting said first and second loop members is a loop interconnecting strap member attached at one end to said first loop member and attached at another end to the second portion of said second loop member.

3. A windblast arm protector assembly, as set forth in claim 2, wherein said ejection seat has a back pad section, a seat pad section, and a lateral leg guard member adjacent each side-edge of said seat pad section, and wherein said means for releasably securing said arm restraining means to said ejection seat includes:
   a. a first ring member interconnecting said first loop member and said back pad section of said ejection seat; and
   b. a second ring member interconnecting said second loop member and a lanyard member, with said second ring member initially disposed adjacent said shoulder opening of said sleeve member;
   whereby when said lanyard member is pulled during ejection, said second ring member moves downwardly in response to said lanyard's pull force and detaches said second portion of said second loop member from said outer surface of said sleeve member to which said second portion is releasably attached; and
   thereby, said second loop member is tensioned against said sleeve member, said first loop member supports said second loop member and prevents said sleeve member from sliding down the arm being restrained by said sleeve member, said loop interconnecting strap member creates a tension load path between the top of the second portion of said second loop member and the back portion of said first loop member and prevents the lower portion of said sleeve member from moving backwardly, and said arm restraining means provides support and protection to said arm against windblst forces.

4. A windblast arm protector assembly, as set forth in claim 3, wherein said arm restraining means further includes means, attached to said shoulder opening of said sleeve member, for holding open said shoulder opening, thereby providing for easy donning and doffing capabilities of said sleeve member.

5. A windblast arm protector assembly, as set forth in claim 4 wherein:
   a. said sleeve member is made of fabric;
   b. said first loop member, said second loop member, and said loop interconnecting strap member are made of webbing material;
   c. said first and second ring members are made of metal; and
   d. said means for holding open said shoulder opening includes tubing attached to, and conforming to the shape of, said opening.

6. A windblast arm protector assembly, as set forth in claim 4, wherein said assembly has two arm restraining means.

7. A windblast arm protector system for use in ejecting from an aircraft, comprising:
   a. an open ejection seat, and
   b. a windblast arm protector assembly for use by an occupant of said open ejection seat, wherein said assembly includes:
      (1) means, for each arm of said occupant, for accepting, supporting and restraining said arm while it is in a flexed position adjacent occupant's side during ejection of said seat and of said occupant together from said aircraft, wherein this means includes a full length sleeve member independent of any garment body, with said sleeve member shaped and dimensioned from its shoulder area to its wrist area in the form of a flexed arm and has a shoulder opening and a wrist opening, a first loop member disposed around, and attached to the inside perimeter of said shoulder opening, a second loop having a first portion extending internally of said sleeve member from said shoulder opening to said wrist opening and attached to the inner surface of said sleeve member near said wrist opening, wherein said second loop member has a second portion extending externally of said sleeve member from said wrist opening to said shoulder opening, with said second portion releasably attached to the outer surface of said sleeve member, and means, operably associated with said first and second loop members, for interconnecting said first and second loop members; and
      (2) means, operably connected to said ejection seat and to said arm restraining means, for releasably securing said arm restraining means to said ejection seat.

8. A windblast arm protector system, as set forth in claim 7, wherein said windblast arm protector assembly inlcudes two arm restraining means.

* * * * *